May 30, 1961 J. L. PETTUS ET AL 2,986,608

MAGNETIC RECORDING CROSS-TALK ELIMINATION

Filed April 4, 1958

INVENTORS
JAMES L. PETTUS &
MICHAEL RETTINGER
BY [signature]
ATTORNEY

United States Patent Office 2,986,608

Patented May 30, 1961

2,986,608

MAGNETIC RECORDING CROSS-TALK ELIMINATION

James L. Pettus and Michael Rettinger, Encino, Calif., assignors to Radio Corporation of America, a corporation of Delaware Filed Apr. 4, 1958, Ser. No. 726,468

5 Claims. (Cl. 179—100.2)

This invention relates to magnetic sound recording and reproduction, and particularly to a cross-talk reducer for multiple track magnetic recording systems.

In magnetic sound recording, special effects such as stereophonic and directional sound are usually obtained by the use of several magnetic tracks positioned longitudinally of a single film or tape. These tracks are recorded with multiple magnetic heads mounted coaxially and transversely of the film or tape. The tracks may contain different portions of the same signal or they may contain three different signals such as dialogue, music, and background effects, when used for motion picture film.

Because of the high frequency leakage flux which couples one recording head to adjacent recording heads and the low frequency fringing flux which will record in adjacent tracks during the recording operation, it has been found that the signal being recorded can be heard on adjacent tracks, when no signal has been recorded thereon, at a level of approximately forty decibels lower than the level of the track being recorded. This is referred to as cross-talk and is found in track areas immediately adjacent the recorded track. However, the cross-talk level on farther spaced track areas is generally too low to be detectable. The present invention, therefore, is directed to a system for cancelling or neutralizing the unwanted signals in adjacent tracks, the level of which is too high for commercial use.

Various systems for reducing cross-talk have been suggested, such as shown in Singer Patent No. 2,727,096, of December 13, 1955, and Livadary Patent No. 2,806,-092, of September 10, 1957. In these prior systems, the actual signal recording winding on the magnetic core of the head is used for neutralizing the cross-talk voltages or currents. Since the audio frequency signal has a wide frequency range, such as from 30 to 15,000 cycles per second, it is difficult to provide the desired neutralization at all frequencies when the recording windings are used. To improve the cross-talk neutralization, the present invention utilizes an auxiliary winding which is interconnected with another auxiliary winding through a potentiometer and phase shifter, the interconnected auxiliary windings being on adjacent heads, it being found that there is negligible cross-talk between two magnetic heads separated by a third magnetic head.

The principal object of the invention, therefore, is to facilitate the recording of multiple track magnetic sound tracks without cross-talk.

Another object of the invention is to provide an improved multi-track sound recording system.

A further object of the invention is to provide a multi-track sound recording system in which all the cross-talk between adjacent magnetic heads is substantially neutralized.

Figure 1:
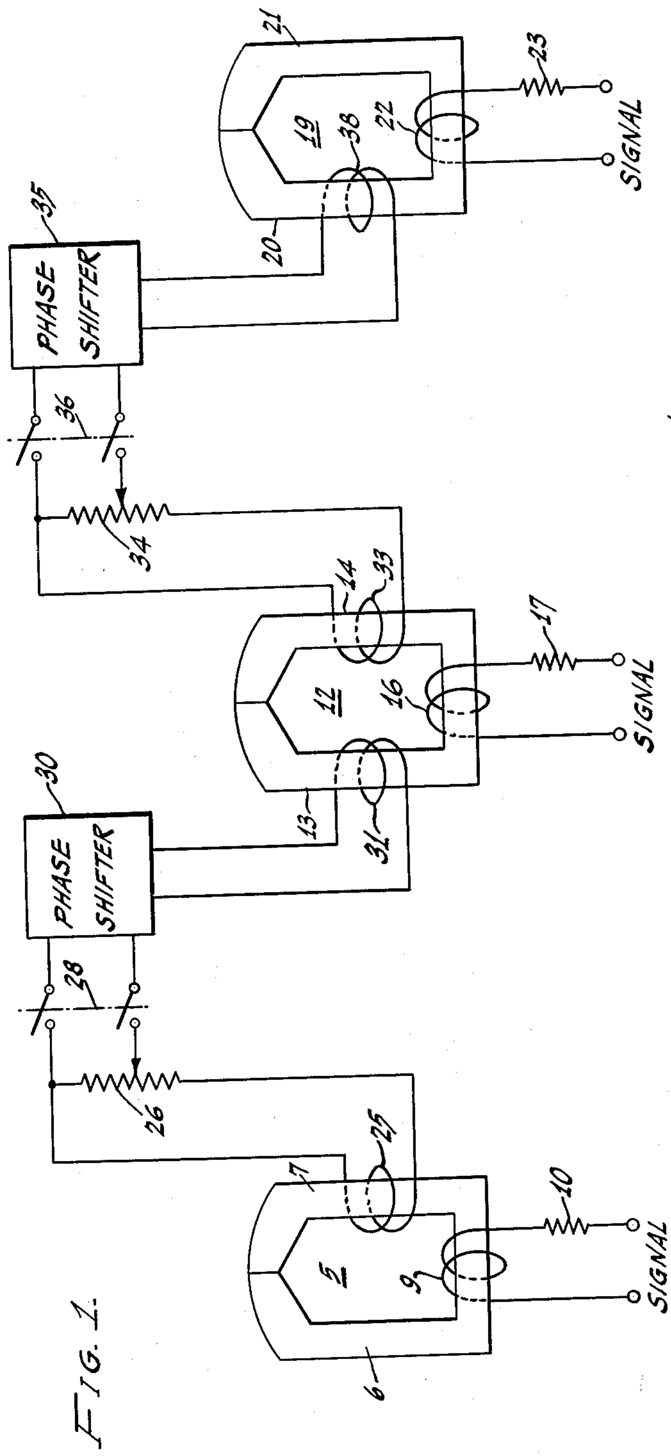
Figure 2:
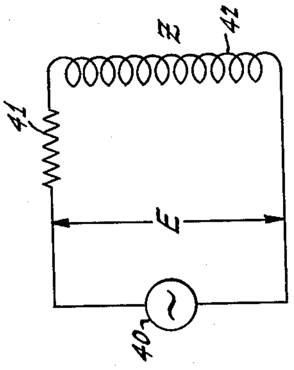

A better understanding of this invention may be had from the following detailed description when read in connection with the accompanying drawings, in which:

Fig. 1 is a diagrammatic view of a multi-magnetic head sound recording system embodying the invention; and Fig. 2 is a circuit diagram illustrating the constant current principle embodied in the invention.

Referring, now, to the drawings, a magnetic head 5 has core legs 6 and 7. An audio signal with the usual bias current is impressed on the winding 9 over a constant current resistor 10. A second magnetic recording head 12 having a leg 13 and a leg 14 has a signal winding 16 thereon connected over a constant current resistor 17, the audio signal with the usual bias being impressed on winding 16. A third magnetic head 19 has core legs 20 and 21 and a signal winding 22 connected over a constant current resistor 23, the signal again being mixed with the bias current when impressed on the winding.

On leg 7 of magnetic head 5 is an auxiliary winding 25 which is connected to a potentiometer 26 and then over a switch 28, when closed, to a phase shifter 30. The phase shifter 30 is connected to an auxiliary winding 31 on the core leg 13 of magnetic head 12.

On the core leg 14 of the magnetic head 12, an auxiliary winding 33 is connected over a potentiometer 34 to a phase shifter 35 when a switch 36 is closed. The phase shifter 35 is connected to an auxiliary winding 38 of core leg 20 of magnetic head 19.

As mentioned above, since magnetic heads 5 and 19 are separated by magnetic head 12, there is insufficient flux linkage between heads 5 and 19 to require any neutralization betwen them. However, the adjacent heads are provided with neutralization circuits to prevent any cross-talk recording in the adjacent tracks. The potentiometers 26 and 34 are used to control the voltage required for neutralization, depending upon the type of magnetic heads, the amount of leakage therefrom, and the type of magnetic record medium being used. The interconnecting circuits between adjacent heads may operate in either direction and are particularly effective in neutralizing the induced cross-talk in the adjacent track by reason of the use of the auxiliary winding which is independent of the signal windings. Thus, only induced currents are detected by the auxiliary windings, and this feature, in connection with the constant current resistors, will provide substantially complete neutralization over the usual recorded audio frequency range. With auxiliary windings, the voltage balance therebetween can be adjusted more accurately than when the signal windings are used. Also, because of the various, small shifts in phase caused by the elements in the interconnecting circuits, the phase shifters are adjusted to provide for optimum cancellation. Although only three magnetic heads are illustrated, it is to be understood that the system is applicable to any number of recording transducers as long as there is a neutralization circuit between adjacent heads.

Referring, now, to Fig. 2 in which the constant current resistor action is illustrated, a circuit is shown in which an alternating frequency source 40 is connected over a resistor 41 to an inductive impedance load 42. The mathematics of this circuit is as follows:

The impedance Z is equal to $2\pi$ FL where F is the frequency of the source 40, and L is the inductance of the impedance 42. The current I in the circuit without the resistance is equal to $$\frac{E}{Z} \text{ or } \frac{E}{2\pi FL}$$

If we now assume a constant inductance, the current will vary inversely with the frequency, the higher the frequency, the lower the current. In order to achive constant current penetration into the load from a constant voltage generator, it is necessary to connect in series with the load a resistance whose value is substantially larger than that of the load. The current then is given by the equation $$\frac{E}{R+Z}$$

Now, if the resistance is considerably larger than Z, we obtain for the operating current $$\frac{E}{R}$$

which is substantially independent of frequency and, therefore, essentially constant.

Thus, with resistors 10, 17, and 23 of the desired value, and the coupling windings of the heads being independent of the signal windings, a better neutralization of cross-talk effects is obtained.

We claim:

1. A cross-talk eliminating system for a multi-track magnetic recorder adapted to record a plurality of signal tracks on a magnetic film, said system comprising a plurality of magnetic recording heads adapted to contact said film transversely thereof to record signals on said film in a plurality of parallel magnetic sound tracks longitudinally of said film, a signal winding one each of said heads, an auxiliary winding on each of said heads, a potentiometer, and a phase shifter, said potentiometer and phase shifter being connected in series with the auxiliary windings on adjacent ones of said heads.

2. A cross-talk eliminating system in accordance with claim 1 in which a constant current resistor is connected to each of said signal windings.

3. A cross-talk eliminating system for a multi-track magnetic recorder adapted to record a plurality of signal tracks on a magnetic medium longitudinally of said medium comprising a plurality of magnetic recording heads adapted to contact said medium transversely thereof, a winding on each of said heads on which a signal to be recorded is adapted to be impressed, auxiliary windings on said heads, and an interconnecting circuit between said auxiliary windings on adjacent heads, each of said interconnecting circuits between adjacent heads including means for controlling the voltage transfer between interconnected auxiliary windings and means for controlling the phase shift of said voltage between said interconnected auxiliary windings.

4. A cross-talk eliminating system in accordance with claim 3 in which said voltage control means is a potentiometer connected in series with said phase shift controlling means.

5. A cross-talk eliminating system in accordance with claim 4 in which a constant current resistor is connected to each of said signal windings.

References Cited in the file of this patent

UNITED STATES PATENTS

| | | |
|---|---|---|
| 2,700,703 | Nordyke | Jan. 25, 1955 |
| 2,704,789 | Kornel | Mar. 22, 1955 |
| 2,713,676 | Fleming | July 19, 1955 |
| 2,727,096 | Singer | Dec. 13, 1955 |
| 2,822,533 | Duinker et al. | Feb. 4, 1958 |
| 2,871,464 | Wright et al. | Jan. 27, 1959 |
| 2,901,549 | Serrell | Aug. 25, 1959 |

FOREIGN PATENTS

| | | |
|---|---|---|
| 776,401 | Great Britain | June 5, 1957 |
| 1,117,701 | France | May 25, 1956 |